Figure 1:
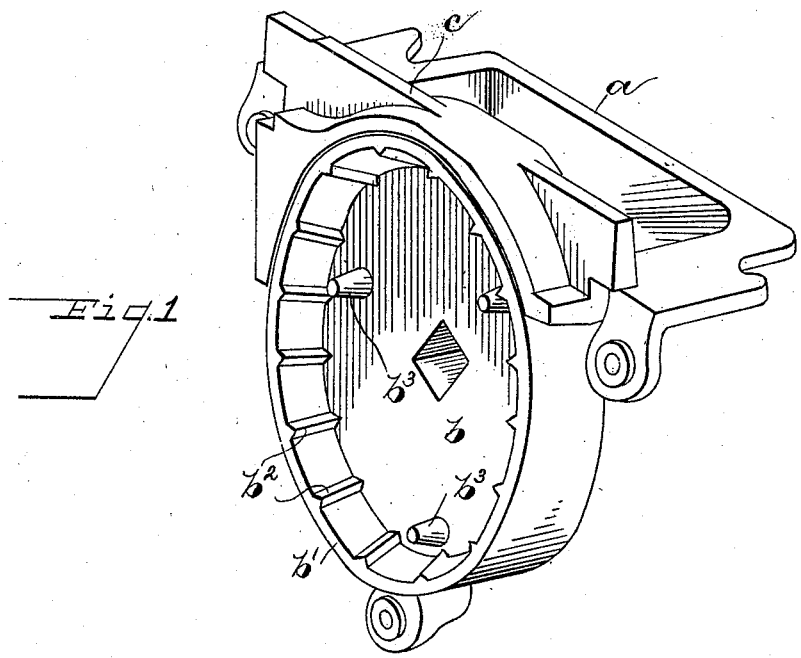

No. 841,887. PATENTED JAN. 22, 1907.
F. R. PACKHAM & G. P. OATES.
DISTRIBUTING DEVICE FOR GRAIN DRILLS.
APPLICATION FILED AUG. 3, 1906.

3 SHEETS—SHEET 1.

Witnesses

Inventors
Frank R. Packham
and George P. Oates

By
Staley & Borman
Their Attorneys

No. 841,887. PATENTED JAN. 22, 1907.
F. R. PACKHAM & G. P. OATES.
DISTRIBUTING DEVICE FOR GRAIN DRILLS.
APPLICATION FILED AUG. 3, 1906.

3 SHEETS—SHEET 2.

No. 841,887.

PATENTED JAN. 22, 1907.

F. R. PACKHAM & G. P. OATES.
DISTRIBUTING DEVICE FOR GRAIN DRILLS.
APPLICATION FILED AUG. 3, 1906.

3 SHEETS—SHEET 3.

UNITED STATES PATENT OFFICE.

FRANK R. PACKHAM AND GEORGE P. OATES, OF SPRINGFIELD, OHIO, ASSIGNORS TO THE AMERICAN SEEDING MACHINE COMPANY, OF SPRINGFIELD, OHIO, A CORPORATION OF OHIO.

DISTRIBUTING DEVICE FOR GRAIN-DRILLS.

No. 841,887. Specification of Letters Patent. Patented Jan. 22, 1907.

Application filed August 3, 1906. Serial No. 328,985.

*To all whom it may concern:*

Be it known that we, FRANK R. PACKHAM and GEORGE P. OATES, citizens of the United States, residing at Springfield, in the county of Clark and State of Ohio, have invented certain new and useful Improvements in Distributing Devices for Grain-Drills, of which the following is a specification.

Our invention relates to grain-drills, particularly to grain-distributing devices therefor.

The object of the invention is to provide a simple and comparatively cheap structure in which the distributing-wheel in addition to its usual function will serve as a mechanical agitator, operating by its rotation to prevent the bridging of fibrous bearded grains.

It has been found in practice that certain bearded grains, such as oats of the rust-proof variety, and some varieties of rice by becoming interengaged in the hopper tend to bridge or arch and support the grain above, thus preventing it being fed through the distributing device. To prevent such bridging or arching is the primary object of the present invention.

A further object is to provide means for advancing or expelling the measured grain which, owing to the above-mentioned peculiarity, lingers in the measuring-channel, and thus greatly increasing the accuracy of the sowing.

With the above primary and other incidental objects in view, as will appear from the specification, the invention consists of the construction, the parts, the combination, and arrangement thereof or their equivalents, hereinafter described, and set forth in the claims.

In the drawings there is shown a distributer of the double-hopper variety having a single distributing-wheel adapted to receive grain upon either side, the one side of said wheel being plain, as ordinarily constructed, while the other side is provided with the mechanical agitating means which forms the subject of the present invention.

Figure 2:
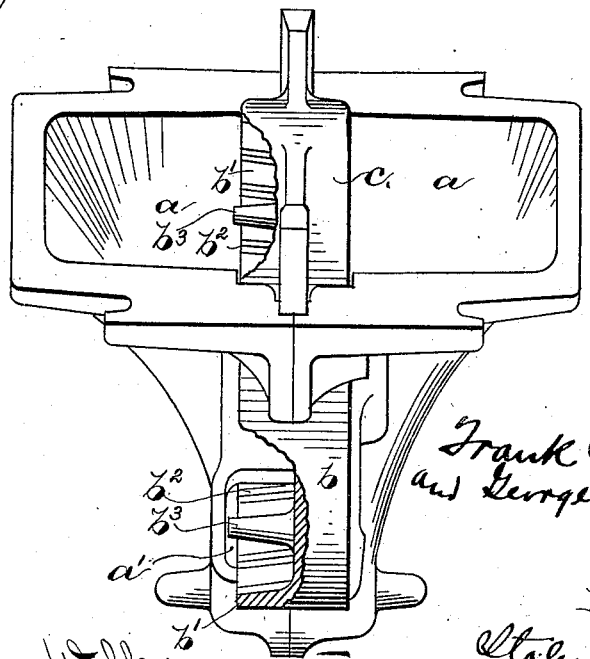
Figure 3:
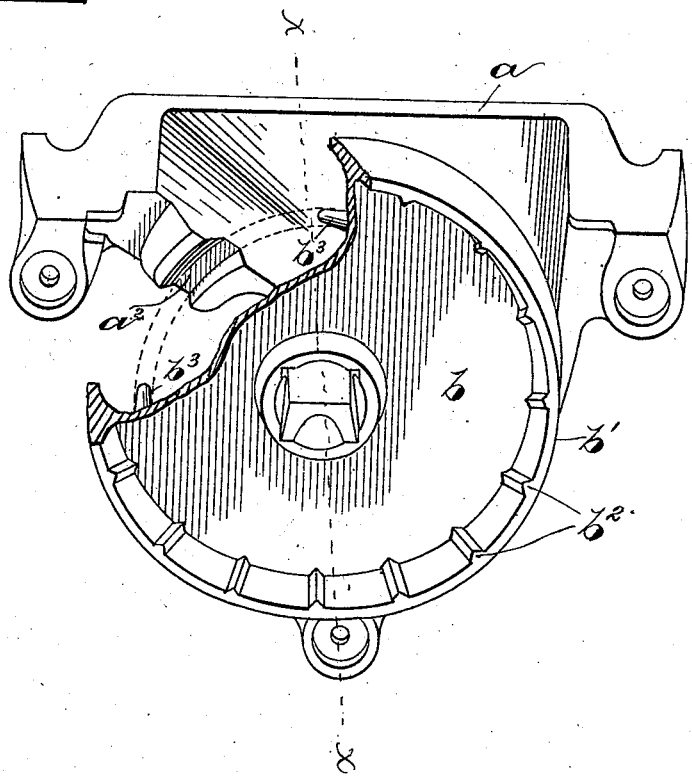
Figure 4:
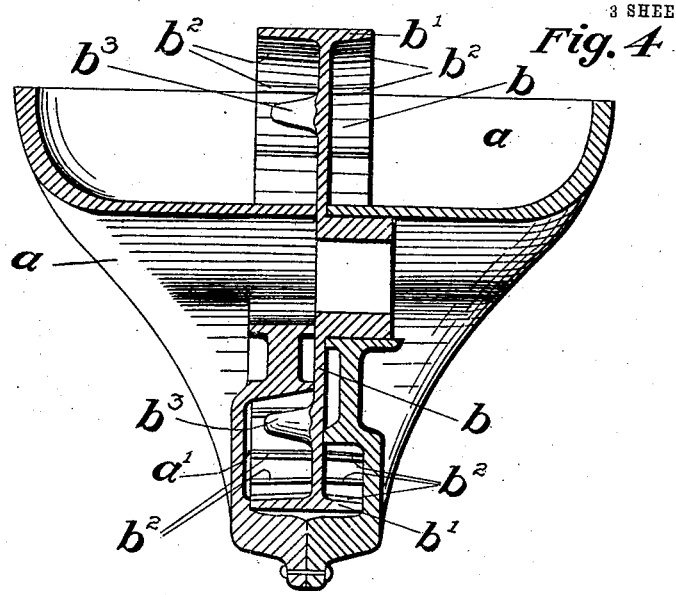
Figure 5:
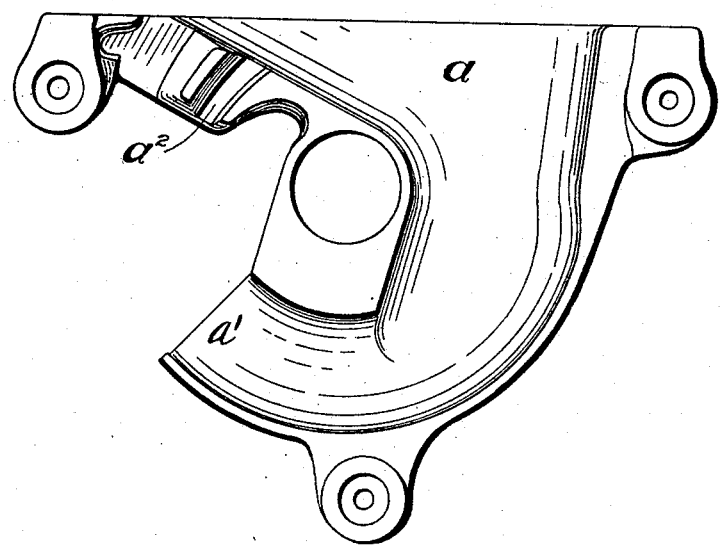

In the drawings, Figure 1 is a perspective view of the distributing device with one of the hoppers removed to show the side of the distributer-wheel provided with the agitating device for the bearded grain. Fig. 2 is a perspective view from the rear or discharge side of the distributer. Fig. 3 is a perspective view of the distributer with one of the hopper members removed and the distributer-wheel partly broken away to show the recess in the opposite hopper, through which the agitating-studs move. Fig. 4 is a vertical sectional view of the device, the section being taken on a line through the center of the hub of the distributer-wheel, as indicated by the line $x$ $x$ in Fig. 3, both halves of the casing, however, being shown in the view, the view being one looking to the right of Fig. 3.

Like parts are represented by similar characters of reference throughout the several views.

Referring to the drawings by letter, $a$ $a$ represent the hopper members, within which is located the revoluble distributer-wheel $b$. Extending over the distributer-wheel $b$ and engaging with the opposite sides of the hopper members $a$ $a$ is a bridge-piece $c$, conforming substantially to the periphery of the distributer-wheel $b$ and adapted to form the lower edge of a partition in the grain-box of the drill. The distributer-wheel $b$ is provided with flanges $b'$, having on the interior thereof a series of ribs $b^2$, which serve to carry the grain from the hopper $a$ through the distributing-channel $a'$, formed in said hopper members $a$, and to discharge the same outside the distributer structure. The opposite sides of the distributer $b$ are preferably adapted to grains of different kinds. Projecting from the web of the distributer-wheel $b$ and located at points intermediate the center and flange are one or more studs or fingers $b^3$. As the distributer-wheel rotates the fingers $b^3$ engage with and agitate the grain within the hopper $a$ and prevent the grain from becoming interlocked, so as to retard the flow of grain through the device. The studs $b^3$ are preferably arranged in such relation to the flange $b'$ that as they rotate they will pass out of the hopper member $a$ through the measuring-channel $a'$, as shown in Fig. 2, thus assisting in the discharge of the grain through said measuring-channel and preventing the bearded grain becoming interlocked therein. Upon continued rotation of the distributer-wheel $b$ the studs or flanges $b^3$ again enter the hopper member $a$ through a suitable groove or recess $a^2$ in the wall of said hopper member $a$, as shown in Fig. 3. It will be seen that there is thus provided a structure adapted to feed fibrous bearded grains, as described, possessing the features of advantage hereinbefore enumerated as desirable and which is obviously susceptible of modification in its form, proportion, and arrangement of parts without departing from the principle involved or sacrificing any of its advantages.

Having thus described our invention, we claim—

1. In a distributer for grain-drills, a hopper, a revoluble distributer-wheel, a flange on said wheel and ribs formed on the interior of said flange, the said ribs and flanges extending up within the hopper during the revolution of the wheel, the studs projecting from said wheel located between the flange and the center of the wheel, and upon the revolution thereof adapted to agitate the grain within the hopper, substantially as specified.

2. In a distributer for grain-drills, a hopper, a flanged distributer-wheel, ribs on the interior side of the flange, said wheel and flange being located so that part of the wheel and the flange will extend up within the hopper, studs projecting from the web of said wheel and also located to extend within the hopper during the revolution of the wheel, for the purpose specified.

3. In a distributer for grain-drills, the combination of a hopper with a distributer-wheel, a flange on said wheel, a plurality of ribs on the interior of the flange, studs projecting outwardly from the web of the wheel located on the web in such manner that they will extend up into the hopper, whereby the grain will be agitated by the studs to insure the proper carrying of the grain by the flange, substantially as specified.

4. In a distributer for grain-drills, a hopper member, a revoluble distributer-wheel, studs projecting from the web of said distributer-wheel, a measuring-channel formed in said hopper member through which said studs, upon the revolution of the distributer-wheel, will pass from the hopper member, and a groove or channel formed in the wall of said hopper member through which, upon continued rotation of the distributer-wheel, said studs will reënter the hopper, substantially as specified.

In testimony whereof we have hereunto set our hands this 28th day of July, A. D., 1906.

FRANK R. PACKHAM.
GEORGE P. OATES.

Witnesses:
 FLORENCE PACKHAM,
 CHAS. I. WELCH.